March 18, 1924.                               1,486,883
E. P. HALLIBURTON
METHOD OF HYDRATING CEMENT AND THE LIKE
Filed June 20, 1922
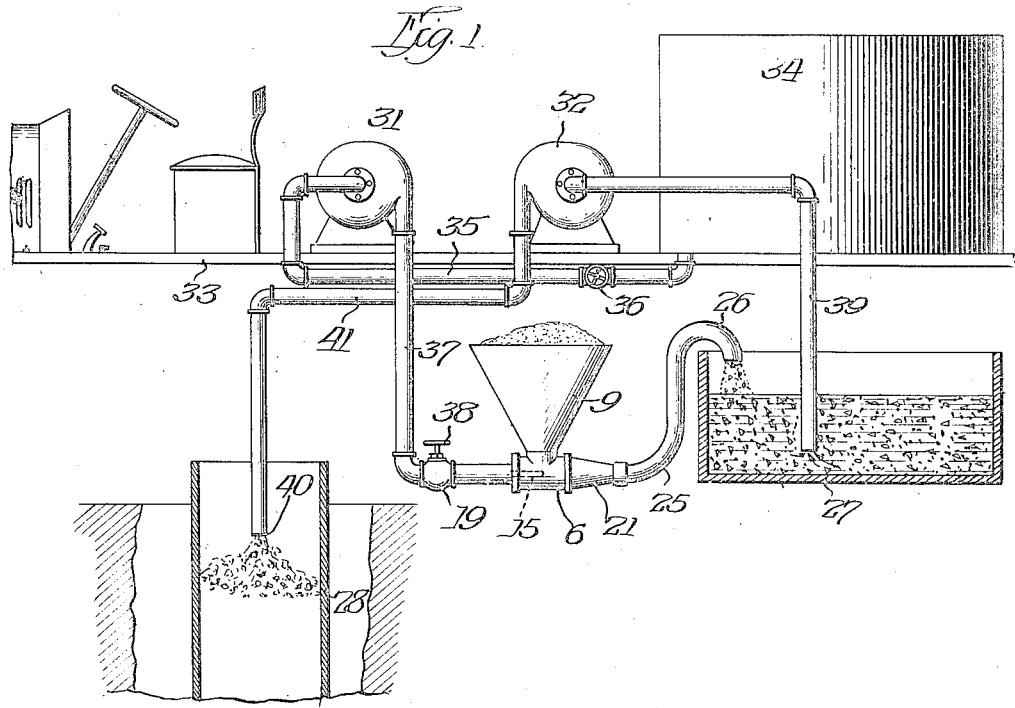
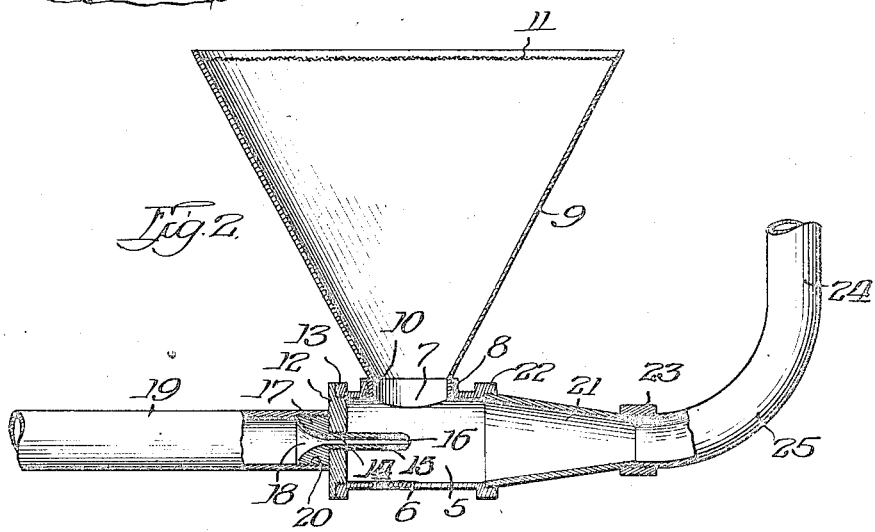

Patented Mar. 18, 1924.

1,486,883

UNITED STATES PATENT OFFICE.

ERLE PALMER HALLIBURTON, OF DUNCAN, OKLAHOMA.

METHOD OF HYDRATING CEMENT AND THE LIKE.

Application filed June 20, 1922. Serial No. 569,738.

*To all whom it may concern:*

Be it known that I, ERLE P. HALLIBURTON, a citizen of the United States, and resident of Duncan, in the county of Stephens, State of Oklahoma, have invented certain new and useful Improvements in Methods of Hydrating Cement and the like, of which the following is a complete and exact specification.

This invention relates broadly to changing the state of materials and embodies improvements in the reduction of comminuted materials, such as cement and the like, to a plastic state for use, and more particularly pertains to an improved method of and means for mixing water or other fluid and hydraulic cement or the like.

The principal objects and advantages which characterize this invention reside in the provision of an improved method of reducing dry cement and other comminuted compositions to plastic state; the provision of improved means for reducing cement and other comminuted substances to plastic state for use; the provision of an improved method of mixing hydraulic cement and water or other fluid; the provision of means for carrying out the method above referred to; for mixing hydraulic cement, for example of the proper consistency for use in cementing oil wells; the provision of an improved method of combining cement and fluid in variable proportions for producing a plastic composition of various consistencies and in various quantities per unit of time; and operable to produce a plastic composition continuously of one consistency and quantity per unit of time, or to produce a composition of various consistencies without interruption of the process; and the provision of a method capable of being carried out by an apparatus and possessing the features referred to which is simple, compact, unitary, efficient in operation, and capable of manufacture at low cost and especially useful in conjunction with the method of cementing oil wells disclosed in my Patent No. 1,369,891.

A further characteristic of this invention is more particularly the reduction of dry cement to a plastic state by introduction of a quantity of such material into a preferably high velocity stream of non-compressible fluid, such as water, wherein by the control of the water pressure and consequent velocity of the stream, and the rate of discharge of the plastic mixture, I am enabled to regulate the mixture produced.

The process involved in this invention may, of course, be carried out by one of several structural embodiments, but in view of the adaptability of the structural embodiment illustrated herewith to the cementing of oil wells, I prefer to employ this structure, the accompanying drawings illustrating the apparatus as follows:

Figure 1 is an elevational view of the apparatus assembled for use.

Figure 2 is an enlarged vertical sectional view of the mixing device.

Figure 3 is a detail sectional view of a modification.

Referring more particularly to the drawing, and first to Figure 2, wherein the mixing device per se is illustrated, there is provided a mixing or vacuum chamber 5, afforded within the T-pipe section 6, the latter having an opening 7 at one side, which is preferably disposed at the top, said opening being bordered by an internally threaded annular flange 8. A frusto-conical hopper 9 is provided, said hopper having an externally threaded throat flange 10 at the reduced end, said flange 10 being in threaded engagement with the flange 8. A screen 11 extends across the larger open end of the hopper.

As previously generally pointed out, the fluid under pressure is introduced into the chamber 5, and to this end I provide a circular bushing 12, in threaded engagement with one end (termed the rear end) of the pipe section 6, the wall of said section being enlarged at 13 for the sake of strength. The bushing 12 has an axial threaded opening 14, through which opening extends a nozzle or jet pipe 15, the discharge end 16 of said nozzle being approximately in alinement with the axis of the throat flange 10, and said nozzle or jet pipe being in threaded engagement with said axial opening 14. The receiving or outer end of the nozzle 15 is enlarged at 17, and the bore of the nozzle is flared at 18, a fluid conducting pipe 19 being in threaded engagement at 20 with said enlargement 17. The conduit 19 leads to a suitable source of fluid, such as water, under pressure, as will presently appear.

The forward or discharge end of the chamber 5 communicates with a tapering pipe section 21, (hereinafter termed a swedge nipple) said swedge nipple being in threaded engagement at its larger end with an internally threaded annular flange 22, formed on the pipe section 6. The forward reduced end of the swedge nipple is connected, by a threaded sleeve 23, to the sinuated discharge conduit 24, which latter is provided with the reverse curves 25 and 26, and discharges into a suitable temporary container 27, shown in Figure 1. If desired, the conduit 24 may discharge directly into the well casing 28 seen in Figure 1 or to any other place at which the mixture is to be used, but, in view of certain conditions which will be hereinafter set forth, it is desirable that added pressure be imposed upon the mixture, especially where employed in shutting off water in an oil or gas well.

In the operation of the mixing device just described, which serves to carry out the method of mixing, per se, a quantity of dry cement or the like is deposited upon the screen 11, and passes into the hopper, the screen preventing any large lumps from passing into the hopper. The jet 15 is now started, that is, non-compressible fluid, such as water, under pressure is forced through pipe 19 and issues at a relatively high velocity from the discharge end of said nozzle or jet. The introduction of the high velocity stream into the quantity of cement entering the mixing chamber performs several functions; namely, creates a partial vacuum in the chamber 5; secondly, assists in drawing additional cement into the chamber; third, thoroughly mixes and impregnates or saturates every particle of cement with water; and lastly, serves to discharge the mixture thus formed through the swedge nipple 21 and conduit 24.

This introduction of cement into the mixing chamber and its discharge mixed with water or other liquid, subject to a limited retardation by the swedge nipple 21, results in substantially a complete absorption of the liquid by the particles of cement or other comminuted material, probably for two reasons, namely, the impact of the liquid on such particles; and the substantially synchronous withdrawal of substantially all the air contained in such particles, so that the pores of the particles are filled with water. I find in actual practice by test that where proportions by volume, of one cubic foot of cement and two thirds cubic foot of water are employed the resultant volume of mixture, due to this impregnation, is but one and one-eighth as against one and thirty-three one hundredths volume for the best mix heretofore obtainable known to me. This example does not hold good as to the amounts mentioned with all cements, but regardless of the cement employed the resultant volume will be less than that attained in the systems of mixing cement heretofore employed, and known to me.

It will be seen that the continuous forward movement of the mass under the influence of the stream of fluid serves to remove the plastic material at a sufficient speed so that the consistency and quantity per given dimensions of swedge nipple, nozzle, and velocity of stream are maintained substantially constant. Variation in quantity of mixture delivered may be accomplished, as desired, by proper change in velocity of stream, and the consistency of the mixture may be varied by changing the size of nozzle. Similar regulation of quantity and consistency may be accomplished by varying the size of the swedge nipple.

For providing a plastic mixture for cementing oil wells, I find that water supplied at four hundred pounds pressure and one hundred cubic feet in fifteen minutes is satisfactory, the stream thus discharged drawing a sufficient proportion of cement from the hopper to attain the proper mixture. The hopper has a capacity of four standard sacks of cement. Thus, by keeping the hopper filled I am enabled to continuously mix about two hundred standard sacks of cement in approximately fourteen minutes, which is a great saving in time over prior methods.

As an example of the relative sizes of the parts which give satisfactory results, I submit the following: throat opening six inches in diameter; nozzle, three-eighths inch bore; pipe section 5, six inches diameter; swedge nipple, six inches in length by three inches at smaller end; and the hopper is thirty-six inches high, and 30 inches top diameter. Of course, the dimensions of parts and the pressure used are variable, and I therefore do not limit the invention to any dimensions mentioned.

In lieu of the sinuated discharge conduit 24, or as an adjunct thereto, I may employ a pipe section, such as that shown in Figure 3 and designated 29, the interior surface of the section 29 being provided with a series of constrictions 30—30, which may be in the form of so-called riffles, or may be staggered if desired. These have the same effect as the sinuated pipe section; namely, further aid in the mixing of the cement and fluid.

Referring now to Figure 1 wherein the complete system for preparation of the cement mixture which I employ in shutting off water in oil and gas wells is shown, I provide two fluid pumps 31 and 32, respectively, these pumps being conveniently mounted upon the chassis 33 of a motor truck or other suitable vehicle. The pump 31 is used for mixing, and will be referred to as the mixing pump, and the pump 32 is the well pump, or more specifically the mixture feed pump, which serves to introduce the hydrated cement into the well casing. A suitable water storage tank 34 may be conveniently disposed upon the chassis 33, and said tank is connected, directly through a conduit 35, with the mixing pump, a suitable valve 36 controlling flow through said conduit 35. The mixing pump is furthermore connected with the conduit 19 by a vertical pipe section 37, a suitable valve 38 controlling quantity and velocity of flow through the pipe sections 37 and 19. This may be accomplished as well by varying the speed of the pump 31. It will, of course, be readily appreciated that the conduit 35 might be connected to and draw water from any available source of supply.

Thus, it will be observed, I am enabled to regulate to a nicety the consistency of the mixture by proper manipulation of the valve 38 and pump 31, and size of the swedge nipple 21.

The well pump 32 is connected through suction pipe 39, to storage tank 27, and discharges at 40, into the well casing 28, through a conduit 41. The conduit 41 is connected to the casing 28, and the well prepared for cementing, preferably by the provision of the structural elements described in my prior patent hereinbefore mentioned, but not shown here. The two pumps 31 and 32 are preferably of the rotary type, driven in any suitable manner. It will be seen that in cementing an oil or gas well, it is necessary in most instances to use pressure to get the cement down into the well, consequently the preferred employment of the well pump 32, as previously pointed out, instead of directly depositing the hydrated cement mixture in the well casing.

From the foregoing it will be seen that the mixing pump serves to prepare the hydrated cement and deliver it in semi-liquid form to the tank 27, whence the mixture is withdrawn by the well pump as required. The relative speeds of the pumps may be varied as proper to take care of the exigencies which arise in the course of cementing the well. The arrangement of conduits, valves, pumps, and other parts of the device may be varied to suit conditions, the showing in Figure 1 being largely diagrammatic, and therefore, I reserve the right to make such alterations as fall within the spirit of this invention and scope of the claims.

I claim:

1. The method of producing a fluent mixture of liquid and cement which comprises mixing the cement and such liquid in substantially a vacuum created only by the action of a high velocity stream or current of such liquid.

2. The method of reducing cement to a state of moist fluidity which comprises feeding the cement into substantially a vacuum and mixing the cement therein by a high velocity stream or current of liquid only which serves also to create such vacuum.

3. The method of mixing cement and a liquid which comprises depositing the cement in a suitable chamber and withdrawing the cement from said chamber and simultaneously mixing said cement in a partial vacuum created solely by the action of a high velocity stream or current of such liquid.

4. The method of mixing cement and a liquid which comprises depositing the cement in a suitable chamber and withdrawing the cement from said chamber and simultaneously mixing said cement subject to retardation in a partial vacuum created solely by the action of a high velocity stream or current of such liquid.

5. The method of reducing cement and its content to a state of moist fluidity which comprises depositing the cement adjacent to a mixing chamber and directing a high velocity stream or current of liquid only into the mixing chamber for creating a partial vacuum therein for inducting cement into said chamber and for mixing the cement and liquid to cause the liquid to penetrate the particles of cement.

6. The method of producing a fluent mixture of liquid and cement, which comprises depositing the cement adjacent to a mixing chamber and directing a high velocity stream or current only of such liquid through the mixing chamber for creating a region of suction therein for inducting cement into said chamber at a rate proportional to the rate of flow of said stream and for synchronously with said induction mixing the cement and liquid to cause the liquid to penetrate the particles of cement.

7. The method of producing a fluent mixture of liquid and cement which comprises mixing the cement and such liquid in substantially a vacuum created only by the action of a high velocity stream or current of such liquid, and discharging the mixture subject to partial retardation.

8. The method of producing a fluent mixture of liquid and cement which comprises mixing the cement and such liquid in substantially a vacuum created only by the action of a high velocity stream or current of such liquid, and varying the rate of flow of such liquid for varying the quantity of mixture produced.

9. The method of producing a fluent mixture of liquid and cement which comprises mixing the cement and such liquid in substantially a vacuum created only by the action of a high velocity stream or current of such liquid, discharging the mixture subject to a limited retardation and varying the rate of flow of such liquid for varying the quantity of mixture produced.

10. The method of producing a fluent mixture of cement and a liquid, which comprises depositing cement adjacent to a mixing chamber and inducting the cement into said chamber and simultaneously mixing and discharging such cement subject to retardation in the presence of a partial vacuum created solely by the action of a high velocity stream of such liquid.

11. The method of producing a fluent mixture of cement and liquid, which comprises producing a high velocity stream or current of such liquid which forms the sole medium for creating a region of suction in a mixing chamber, and depositing the cement adjacent to said chamber for permitting such stream or current of liquid to advance the cement in response to the action and in the presence of such suction, and imposing limited retardation on the mixture to bring the liquid and cement into intimate association for producing an absorption of the liquid by the particles of cement.

12. The method of producing a fluent mixture of liquid and cement which comprises creating a reduced atmospheric pressure in a chamber solely by a high velocity stream or current of such liquid for inducting such cement into said stream or current and retarding the discharge of the liquid mixture to cause said stream to create an increased atmospheric pressure in such chamber for impregnating the particles of cement with such liquid.

In testimony whereof I hereunto affix my signature.

ERLE PALMER HALLIBURTON.